(12) United States Patent
Isoda et al.

(10) Patent No.: US 6,933,654 B1
(45) Date of Patent: *Aug. 23, 2005

(54) ROTOR OF ROTATING ELECTRIC MACHINE

(75) Inventors: Hitoshi Isoda, Tokyo (JP); Masahiko Fujita, Tokyo (JP); Yoshihito Asao, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/832,234

(22) Filed: Apr. 27, 2004

(51) Int. Cl.$^7$ ............................................. A41F 19/00
(52) U.S. Cl. ................... 310/263; 310/156.72
(58) Field of Search .................. 310/263, 91, 261, 310/156.71–156.73

(56) References Cited

U.S. PATENT DOCUMENTS

| | | | |
|---|---|---|---|
| 5,578,885 A | * | 11/1996 | Alford et al. ............... 310/263 |
| 6,011,343 A | * | 1/2000 | Taniguchi ................... 310/263 |
| 6,201,335 B1 | | 3/2001 | Higashino et al. |
| 6,369,485 B1 | * | 4/2002 | Oohashi et al. ............. 310/263 |
| 6,426,581 B1 | | 7/2002 | York et al. |

FOREIGN PATENT DOCUMENTS

| | | |
|---|---|---|
| EP | 1 117 168 | 7/2001 |
| JP | 11-136913 A | 5/1999 |
| JP | 2001-86715 A | 3/2001 |

* cited by examiner

Primary Examiner—Tran Nguyen
(74) Attorney, Agent, or Firm—Sughrue Mion, PLLC

(57) ABSTRACT

Pole core members of a rotor are fitted on a rotary shaft with claw-shaped magnetic poles engaged with one another from front and rear sides. Each of magnet mounting members for holding magnets against side surfaces of each magnetic pole has magnet retaining portions on both sides and a platelike middle portion. Located between two adjacent claw-shaped magnetic poles, each magnet produces a magnetic field oriented in a direction opposite to the direction of a magnetic flux formed between the adjacent claw-shaped magnetic poles. The claw-shaped magnetic pole has a stopper portion protruding inward from an extreme end of the magnetic pole on an inclined inside surface thereof. The magnet mounting member carrying the magnets in the magnet retaining portions is affixed to each claw-shaped magnetic pole with the middle portion of the magnet mounting member fitted in a recess formed in the inclined inside surface of the magnetic pole.

7 Claims, 6 Drawing Sheets

ROTOR OF ROTATING ELECTRIC MACHINE

BACKGROUND OF THE INVENTION

1. Field of the Invention

The present invention relates generally to a rotor of a rotating electric machine and, more particularly, to a rotor of an alternating current (AC) generator or motor in which the rotor includes a pair of pole core members having a plurality of claw-shaped magnetic poles extending along an axial direction of the rotor at regular intervals around the rotor, wherein the claw-shaped magnetic poles are directed face to face from the individual pole core members and engaged with one another as if surrounding a rotor coil.

2. Description of the Background Art

A construction of a rotor of a conventional rotating electric machine to which the invention is directed is shown in Japanese Laid-open Patent Publication No. 2001-86715, for instance. According to the Publication, the rotor includes a rotor coil and a pair of pole core members having a plurality of claw-shaped magnetic poles extending like claws along an axial direction of the rotor at regular intervals around the rotor. The rotor is constructed by fitting the pole core members on a rotary shaft with the claw-shaped magnetic poles of the two pole core members directed face to face from front and rear sides and engaged with one another so that the claw-shaped magnetic poles surround the rotor coil, wherein a magnet which produces a magnetic field oriented in a direction opposite to the direction of a magnetic flux formed between two adjacent claw-shaped magnetic poles is located between side surfaces of the oppositely directed two adjacent claw-shaped magnetic poles. The rotating electric machine (AC generator or motor) includes the rotor thus constructed and a stator located to surround the rotor, the stator including a stator core on which a stator coil is wound, as illustrated in the aforementioned Patent Publication.

When the pole core members are excited by the rotor coil in this construction, the claw-shaped magnetic poles on one side are magnetized as north (N) poles and the oppositely directed claw-shaped magnetic poles on the other side are magnetized as south (S) poles. As the magnets which produce magnetic fields oriented in directions opposite to the directions of the magnetic fluxes formed between the adjacent claw-shaped magnetic poles are situated between the side surfaces of the oppositely directed adjacent claw-shaped magnetic poles, the number of lines of ineffective magnetic fluxes between the side surfaces of the adjacent claw-shaped magnetic poles is decreased and the number of lines of magnetic fluxes extending from outer peripheral surfaces of the claw-shaped magnetic poles toward the stator is increased.

One construction proposed in the aforementioned patent Publication No. 2001-86715 employs reinforcing members having a generally M-shaped cross section for holding magnets on both side surfaces of each claw-shaped magnetic pole. Another construction proposed in the Publication employs reinforcing members having a generally C-shaped cross section for holding magnets on both side surfaces of each claw-shaped magnetic pole. In either of these constructions, the magnets are held at fixed positions on the side surfaces of the claw-shaped magnetic poles by the reinforcing members against a centrifugal force acting on the magnets due to rotation of a rotor, because the reinforcing members are hooked on the inside of the claw-shaped magnetic poles.

As shown in the foregoing discussion, the rotor of the conventional rotating electric machine (AC generator or motor) includes a pair of pole core members having multiple claw-shaped magnetic poles extending like claws along the axial direction of the rotor at regular intervals around the rotor, in which the pole core members are fitted on the rotary shaft with the claw-shaped magnetic poles of the two pole core members directed face to face from front and rear sides and engaged with one another so that the claw-shaped magnetic poles surround the rotor coil. The magnets which produce the magnetic fields oriented in the directions opposite to the directions of the magnetic fluxes formed between the two adjacent claw-shaped magnetic poles are situated between the side surfaces of the adjacent claw-shaped magnetic poles with the magnets supported by the reinforcing members. In this construction, the magnets supported by the reinforcing members are held in the proximity of each claw-shaped magnetic pole.

In the rotor of the conventional rotating electric machine thus constructed, each of the claw-shaped magnetic poles is narrowed and thinned toward an extreme end, forming an inclined surface on its inside. This construction of the prior art has a problem that the centrifugal force acting on the magnets and vibrations occurring as a result of rotation of the rotor could cause the reinforcing members holding the magnets to shift toward the extreme ends of the claw-shaped magnetic poles, consequently displacing the magnets from their normal positions.

SUMMARY OF THE INVENTION

This invention has been made to provide a solution to the aforementioned problem of the prior art. Accordingly, it is an object of the invention to provide a rotor of a rotating electric machine in which magnets located between side surfaces of adjacent claw-shaped magnetic poles of a pair of pole core members are held stationary on the side surfaces of the claw-shaped magnetic poles regardless of changes in rotating speed of the rotor or recurring cycles of its rotary motion and stoppage.

According to the invention, a rotor of a rotating electric machine includes a rotary shaft, a rotor coil surrounding the rotary shaft, a pair of pole core members having a plurality of claw-shaped magnetic poles extending along an axial direction of the rotor at regular intervals around the rotor, the pole core members being fitted on the rotary shaft with their claw-shaped magnetic poles directed face to face from front and rear sides and engaged with one another so that the claw-shaped magnetic poles surround the rotor coil, a plurality of magnets located on both sides of each claw-shaped magnetic pole such that each of the magnets produces a magnetic field oriented in a direction opposite to the direction of a magnetic flux formed between the adjacent claw-shaped magnetic poles, and a plurality of magnet mounting members for holding the magnets against both side surfaces of each claw-shaped magnetic pole. Each of the magnet mounting members has a generally C-shaped cross section including magnet retaining portions formed on both sides for holding the magnets against the side surfaces of each claw-shaped magnetic pole and a middle portion having a flat platelike shape which matches an inclined inside surface of each claw-shaped magnetic pole, each of the magnet mounting members and the magnets fitted in the magnet retaining portions on both sides together forming a magnet assembly. The claw-shaped magnetic poles of the pole core members each have a stopper portion protruding toward the rotary shaft from the extreme end of each claw-shaped magnetic pole on its inclined inside surface, and the magnet assembly is fixedly mounted on each claw-shaped magnetic pole with the middle portion of the magnet mounting member engaged with the stopper portion formed on the inclined inside surface (or "stepped-down" stage) of each claw-shaped magnetic pole.

In this construction, the magnet assembly and the magnets fitted therein are prevented from being displaced toward the extreme end of each claw-shaped magnetic pole due to a centrifugal force acting on the magnets of the magnet assembly as a result of rotation of the rotary shaft. This construction makes it possible to produce a rotor of a rotating electric machine in which neither the magnet assemblies nor the magnets fitted therein come off or deviate from their normal positions.

These and other objects, features and advantages of the invention will become more apparent upon reading the following detailed description in conjunction with the accompanying drawings.

DESCRIPTION OF THE PREFERRED EMBODIMENTS

First Embodiment

Figure 1:
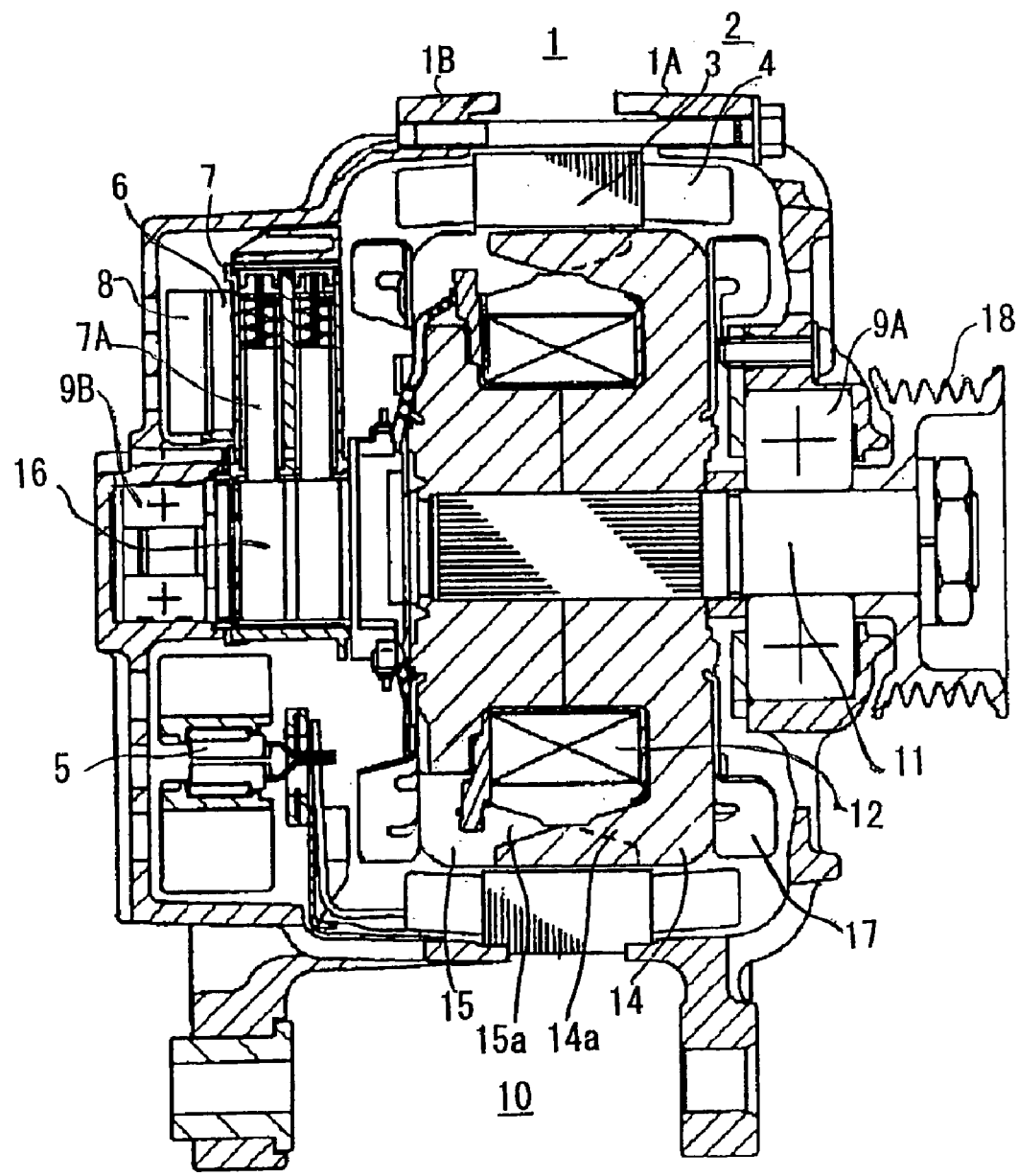
FIG. 1 is a sectional view showing the construction of a rotating electric machine according to a first embodiment of the invention.
Figure 2:
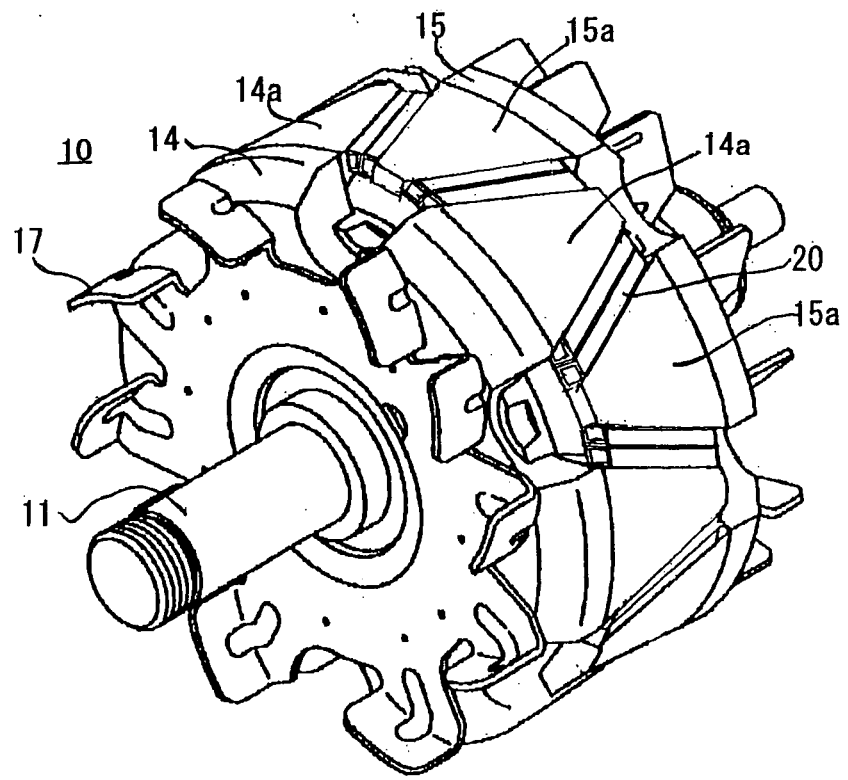
FIG. 2 is a perspective view showing the construction of a rotor of the rotating electric machine of FIG. 1.

FIG. 1 is a sectional view of a rotating electric machine, such as a generator or a motor, according to a first embodiment of the invention, and FIG. 2 is a perspective view of a rotor 10 of the rotating electric machine.

The rotating electric machine includes a casing 1 including a front bracket 1A and a rear bracket 1B, both made of aluminum, a stator 2 including a stator core 3 affixed to an inside wall of the casing 1 and a stator coil 4, a rectifier 5 connected to the stator coil 4 for converting an AC voltage induced in the stator coil 4 into a direct current (DC) voltage, a regulator 6 for regulating the AC voltage produced by the stator coil 4, a brush holder 7 holding brushes 7A through which exciting currents are supplied to the rotor 10 and a heat sink 8 fitted to the brush holder 7.

The rotor 10 includes a rotary shaft 11, a rotor coil 12 surrounding the rotary shaft 11, and a pair of front and rear pole core members 14, 15, the front pole core member 14 having multiple claw-shaped magnetic poles 14a extending like claws along an axial direction of the rotor 10 at regular intervals around the rotor 10 and the rear pole core member 15 having multiple claw-shaped magnetic poles 15a extending like claws along the axial direction of the rotor 10 at regular intervals around the rotor 10. The front and rear pole core members 14, 15 are fitted on the rotary shaft 11 with the claw-shaped magnetic poles 14a, 15a of the front and rear pole core members 14, 15 directed face to face and engaged with one another so that the claw-shaped magnetic poles 14a, 15a surround the rotor coil 12.

Figure 3:
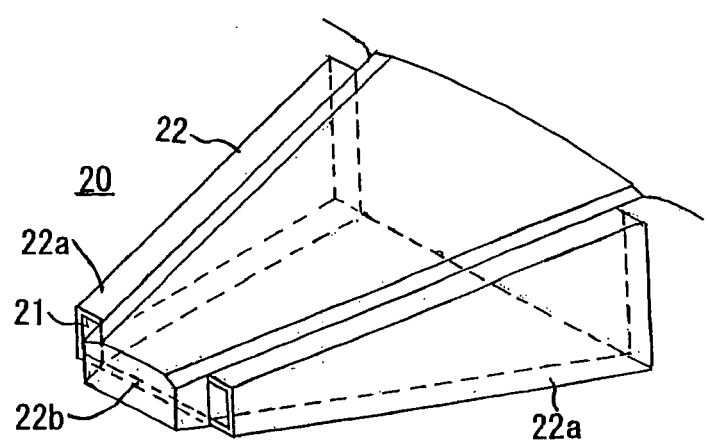
FIG. 3 is a perspective view of a portion including a claw-shaped magnetic pole of the rotor of FIG. 2.

Referring to FIG. 3, mounted on both sides of each of the claw-shaped magnetic poles 14a, 15a is a pair of magnets 21 which produce magnetic fields oriented in directions opposite to the directions of magnetic fluxes formed between the adjacent claw-shaped magnetic poles 14a, 15a. These magnets 21 are fitted in magnet retaining portions 22a of a magnet mounting member 22, which together form a magnet assembly 20.

Slip rings 16 through which the exciting currents are supplied to the rotor coil 12 are fitted on the rotary shaft 11. Also, fans 17 are fitted on the rotary shaft 11 close to its both ends, on the outside of the front and rear pole core members 14, 15. The rotor 10 is supported by the front bracket 1A and the rear bracket 1B rotatably about the rotary shaft 11 via bearings 9A and 9B which are mounted on front and rear portions of the rotary shaft 11, respectively. Further, a pulley 18 is mounted on one end of the rotary shaft 11.

When excited by the rotor coil 12, the claw-shaped magnetic poles 14a, 15a of the front and rear pole core members 14, 15 are magnetized, the claw-shaped magnetic poles 14a of the pole core member 14 producing N poles and the claw-shaped magnetic poles 15a of the pole core member 15 producing S poles, for instance. The magnets 21 are placed between the adjacent claw-shaped magnetic poles 14a, 15a of the front and rear pole core members 14, 15 for producing the magnetic fields oriented in the directions opposite to the directions of the magnetic fluxes formed between the adjacent claw-shaped magnetic poles 14a, 15a which are magnetized to thereby increase the number of lines of magnetic fluxes distributed along a circumferential direction of the rotor 10. Accordingly, the magnets 21 are arranged in such a manner that N poles of the magnets 21 face side surfaces of the claw-shaped magnetic poles 14a producing the N poles, and S poles of the magnets 21 face side surfaces of the claw-shaped magnetic poles 15a producing the S poles. Since the magnets 21 producing the magnetic fields oriented in the directions opposite to the directions of the magnetic fluxes formed between the adjacent claw-shaped magnetic poles 14a, 15a are placed between the side surfaces of the claw-shaped magnetic poles 14a, 15a in this fashion, the number of lines of ineffective magnetic fluxes formed between the side surfaces of the adjacent claw-shaped magnetic poles 14a, 15a is decreased and the number of lines of magnetic fluxes intersecting the stator 2 is increased.

Described below is how the magnets 21 are mounted against the side surfaces of each of the claw-shaped magnetic poles 14a, 15a.

Figure 4:
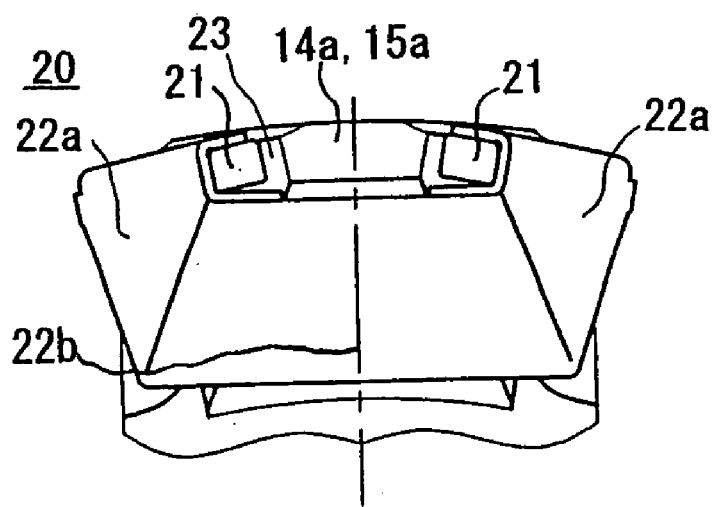
FIG. 4 is a fragmentary perspective view of the claw-shaped magnetic pole of FIG. 3 as viewed from its extreme end.
Figure 5:
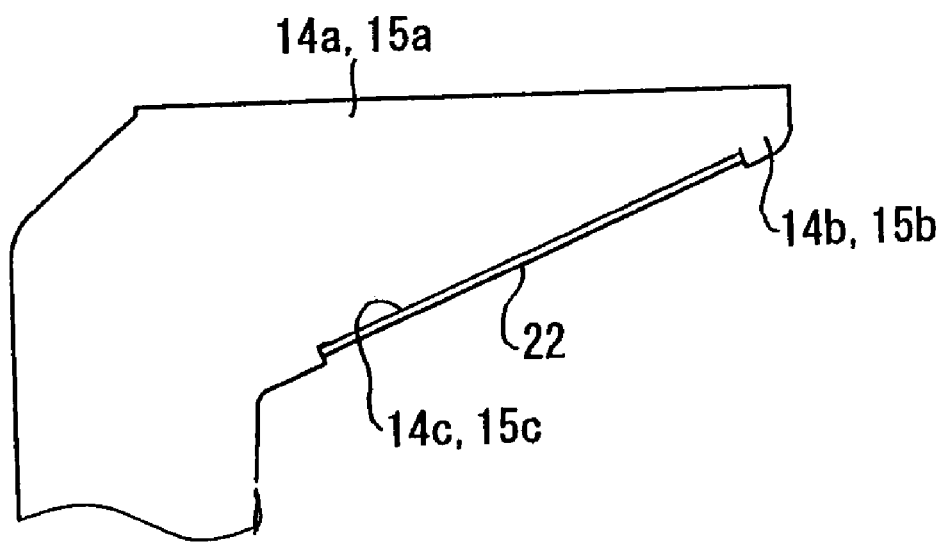
FIG. 5 is a sectional view of the claw-shaped magnetic pole of FIG. 3.

FIG. 3 is a perspective view of a portion including the claw-shaped magnetic pole 14a of the pole core member 14 or the claw-shaped magnetic pole 15a of the pole core member 15, FIG. 4 is a fragmentary perspective view of each of the claw-shaped magnetic poles 14a, 15a as viewed from its extreme end, and FIG. 5 is a sectional view of each of the claw-shaped magnetic poles 14a, 15a taken along a longitudinal direction thereof.

Each of the claw-shaped magnetic poles 14a, 15a becomes thinner toward the extreme end, forming an inclined inside surface as illustrated. This inclined inside surface of each claw-shaped magnetic pole 14a, 15a facing the rotary shaft 11 has a "stepped-down" stage forming a shallow groovelike crosswise recess 14c, 15c in which a middle portion 22b of the magnet mounting member 22 can be fitted, the recess 14c, 15c being bounded by a stopper portion 14b, 15b protruding toward the rotary shaft 11 along the extreme end of the magnetic pole 14a, 15a, as illustrated. Each magnet 21 has a generally platelike shape having a trapezoidal cross section in side view to match the shape of the claw-shaped magnetic pole 14a, 15a.

Each magnet mounting member 22 fitted with two magnets 21 in the magnet retaining portions 22a is mounted on the claw-shaped magnetic pole 14a, 15a on its side (inclined inside surface) facing the rotary shaft 11 so that the magnets 21 are positioned against the side surfaces of the claw-shaped magnetic pole 14a, 15a. The magnet retaining portions 22a of the magnet mounting member 22 are formed by bending side portions of the magnet mounting member 22 in such a manner that, with the magnets 21 positioned against the side surfaces of the claw-shaped magnetic pole 14a, 15a, the bent portions of the magnet mounting member 22 extend along an outer peripheral surface of the claw-shaped magnetic pole 14a, 15a and then parallel to its side surfaces. As the middle portion 22b of the magnet mounting member 22 has a flat platelike shape that matches the inclined inside surface of the claw-shaped magnetic pole 14a, 15a facing the rotary shaft 11, the magnet mounting member 22 has a generally C-shaped cross section as a whole. The magnet mounting member 22 is made of an approximately 0.5 mm thick nonmagnetic stainless steel sheet, for instance. The magnet mounting member 22 and the magnets 21 fitted in the magnet retaining portions 22a which are formed on both sides of the magnet mounting member 22 together constitute the aforementioned magnet assembly 20.

The magnet assembly 20 thus constructed is affixed to the claw-shaped magnetic pole 14a, 15a by applying a bonding agent to the inclined inside surface of the claw-shaped magnetic pole 14a, 15a facing the rotary shaft 11 and to an inner surface of the magnet mounting member 22, mounting the magnet assembly 20 on the claw-shaped magnetic pole 14a, 15a in such a manner that the middle portion 22b of the magnet assembly 20 fits in the recess 14c, 15c formed in the inclined inside surface of the claw-shaped magnetic pole 14a, 15a, and causing the bonding agent to harden. Then, the front and rear pole core members 14, 15 are fitted on the rotary shaft 11 in such a manner that the claw-shaped magnetic poles 14a and 15a extending from the pole core members 14 and 15 engage with one another from front and rear sides as if surrounding the rotor coil 12.

If the magnet assembly 20 is mounted on the claw-shaped magnetic pole 14a, 15a with an adhesive 23 serving as a filling material filled between the magnets 21 and the magnet mounting member 22 and between the magnets 21 and the side surfaces of the claw-shaped magnetic pole 14a, 15a, gaps between the claw-shaped magnetic pole 14a, 15a and the magnet assembly 20 are filled up. This arrangement helps prevent flutter of portions of the magnet assembly 20 around the magnets 21 when the rotor 10 rotates.

The magnet mounting member 22 may be affixed to the inclined inside surface of the claw-shaped magnetic pole 14a, 15a facing the rotary shaft 11 by welding edges of the magnet mounting member 22 to the stopper portion 14b, 15b of the claw-shaped magnetic pole 14a, 15a. The magnet assembly 20 can be affixed to the claw-shaped magnetic pole 14a, 15a with high reliability and flutter of the magnet portions of the magnet assembly 20 potentially occurring when the rotor 10 rotates can be suppressed in this construction too.

The magnets 21 to be positioned against the side surfaces of the claw-shaped magnetic pole 14a, 15a are assembled with the magnet mounting member 22 to form the magnet assembly 20 which is mounted on the claw-shaped magnetic pole 14a, 15a in this embodiment as discussed above. In this construction, the stopper portion 14b, 15b of the claw-shaped magnetic pole 14a, 15a serves to prevent a phenomenon that the magnet assembly 20 is displaced along the inclined inside surface of the claw-shaped magnetic pole 14a, 15a facing the rotary shaft 11 toward its extreme end due to a centrifugal force acting on the magnet assembly 20 as a result of rotation of the rotor 10.

Second Embodiment

Figure 6A:
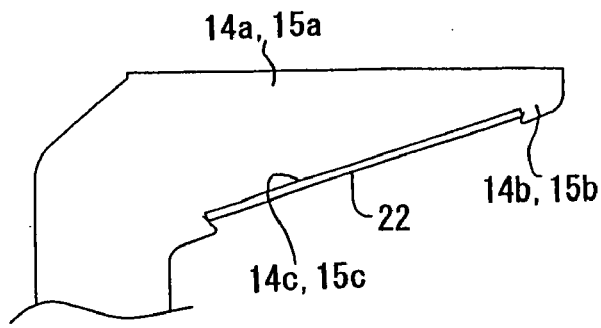
FIGS. 6A, 6B and 6C are explanatory diagrams showing how magnet assemblies are affixed to individual claw-shaped magnetic poles by a caulking method according to a second embodiment of the invention.
Figure 6B:
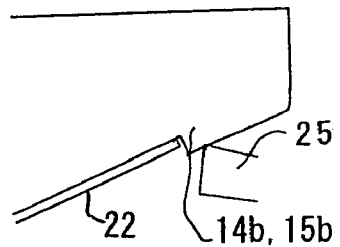
Figure 6C:
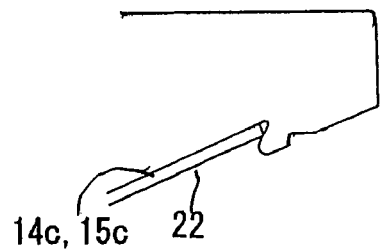

According to a second embodiment of the invention, each magnet assembly 20 of the first embodiment is affixed to the claw-shaped magnetic pole 14a, 15a by caulking. FIGS. 6A, 6B and 6C show how caulking work is carried out. FIG. 6A is a sectional view of the claw-shaped magnetic pole 14a, 15a, FIG. 6B is a fragmentary sectional view showing how the stopper portion 14b, 15b of the claw-shaped magnetic pole 14a, 15a is caulked by using a caulking tool 25 like a chisel, and FIG. 6C is a fragmentary sectional view showing a state in which the stopper portion 14b, 15b has been caulked, in which elements identical or similar to those of the first embodiment are designated by the same reference numerals.

A caulking procedure used in this embodiment includes the steps of fitting the middle portion 22b of the magnet mounting member 22 of each magnet assembly 20 in the recess 14c, 15c formed in the claw-shaped magnetic pole 14a, 15a as shown in FIG. 6A, and caulking the stopper portion 14b, 15b of the claw-shaped magnetic pole 14a, 15a as shown in FIG. 6B to securely retain the middle portion 22b of the magnet mounting member 22 in the recess 14c, 15c as shown in FIG. 6C. After bonding the magnet assemblies 20 to the individual claw-shaped magnetic poles 14a, 15a, the front and rear pole core members 14, 15 are mounted on the rotary shaft 11.

The aforementioned caulking method of the second embodiment makes it possible to securely affix the magnet assemblies 20 to the claw-shaped magnetic poles 14a, 15a with ease and reliability.

Third Embodiment

Figure 7:
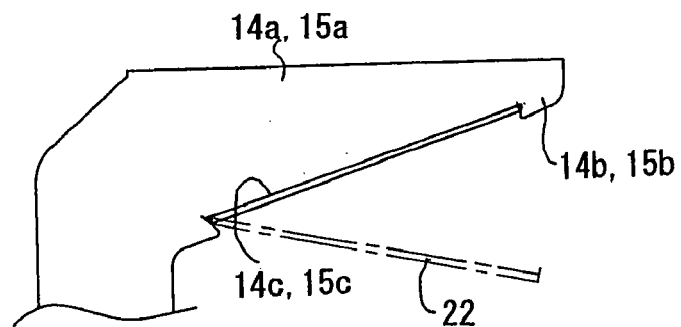
FIG. 7 is an explanatory diagram showing how the magnet assemblies are affixed to individual claw-shaped magnetic poles according to a third embodiment of the invention.

FIG. 7 is a sectional view showing how a magnet mounting member 22 of each magnet assembly 20 is fitted in a recess 14c, 15c formed in each claw-shaped magnetic pole 14a, 15a according to a third embodiment of the invention, in which elements identical or similar to those of the first embodiment are designated by the same reference numerals.

In this embodiment, opposite ends of the recess 14c, 15c in the claw-shaped magnetic pole 14a, 15a are shaped to form slant surfaces which are inwardly inclined toward the recess 14c, 15c. The magnet mounting member 22 of each magnet assembly 20 is bent in a curved shape at its middle portion 22b and fitted into the recess 14c, 15c in the claw-shaped magnetic pole 14a, 15a so that the magnet mounting member 22 is firmly secured in position.

The magnet mounting member 22 of each magnet assembly 20 is fitted with its middle portion 22b warped into the recess 14c, 15c in the claw-shaped magnetic pole 14a, 15a. This construction makes it possible to easily fit and securely affix the magnet assemblies 20 to the claw-shaped magnetic poles 14a, 15a.

Fourth Embodiment

Figure 8:
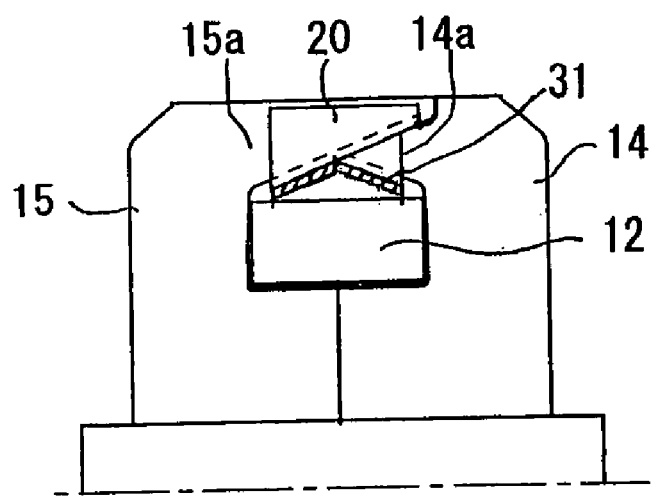
FIG. 8 is a sectional view showing a pole core portion provided with backup rings fitted inside claw-shaped magnetic poles of pole core members according to a fourth embodiment of the invention.
Figure 9A:
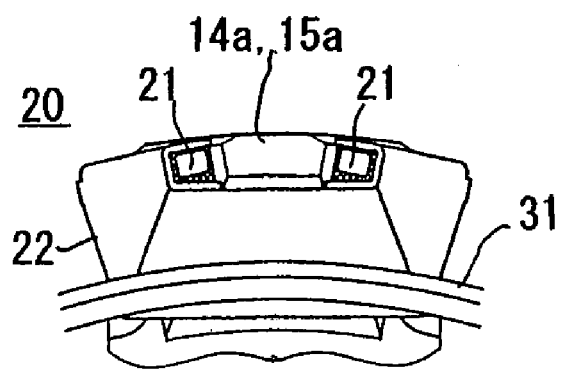
FIGS. 9A and 9B are a fragmentary perspective view of the claw-shaped magnetic pole of FIG. 8 as viewed from its extreme end and a perspective view of the backup ring, respectively.
Figure 9B:

FIG. 8 is a sectional view particularly showing how a pole core portion is assembled according to a fourth embodiment of the invention, FIG. 9A is a fragmentary perspective view of each claw-shaped magnetic pole 14a, 15a as viewed from its extreme end, and FIG. 9B is a perspective view showing the shape of a backup ring 31, in which elements identical or similar to those of the first embodiment are designated by the same reference numerals.

According to the embodiment, one each backup ring 31 is fitted inside the magnet assemblies 20 mounted on the claw-shaped magnetic poles 14a, 15a of the front and rear pole core members 14, 15.

The backup ring 31 is shaped in a truncated circular cone form of which curved outer surface is tapered to fit inside the inclined inside surfaces of the claw-shaped magnetic poles 14a, 15a facing the rotary shaft 11. After fitting the magnet assemblies 20 on the claw-shaped magnetic poles 14a, 15a, the backup ring 31 thus shaped is fitted inside the claw-shaped magnetic poles 14a, 15a of each pole core member 14, 15 such that a large-diameter circumferential portion of the backup ring 31 is situated against the middle portions 22b of the magnet mounting members 22. Then, the front and rear pole core members 14, 15 are mounted on the rotary shaft 11.

The outside diameter of the backup ring 31 is determined taking into account the amount of elastic deformation which occurs when the backup ring 31 is forced against the middle portions 22b of the magnet mounting members 22 which are arranged in a ring form having a specific diameter. In this structure, it is possible to apply an outwardly directed pushing force to the middle portions 22b of the magnet mounting members 22 by fitting the backup ring 31, whereby the magnet assemblies 20 can be firmly affixed to the claw-shaped magnetic poles 14a, 15a.

Fifth Embodiment

Figure 10A:
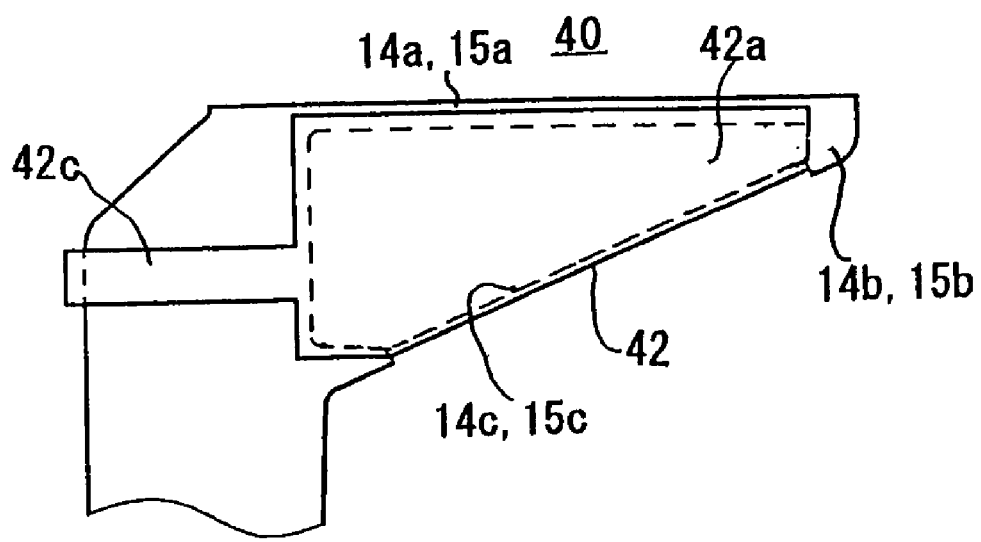
FIGS. 10A and 10B are diagrams showing a construction according to a fifth embodiment of the invention in which a magnet mounting member for mounting a magnet assembly on each claw-shaped magnetic pole has retaining straps for embracing a rear portion of the claw-shaped magnetic pole.
Figure 10B:
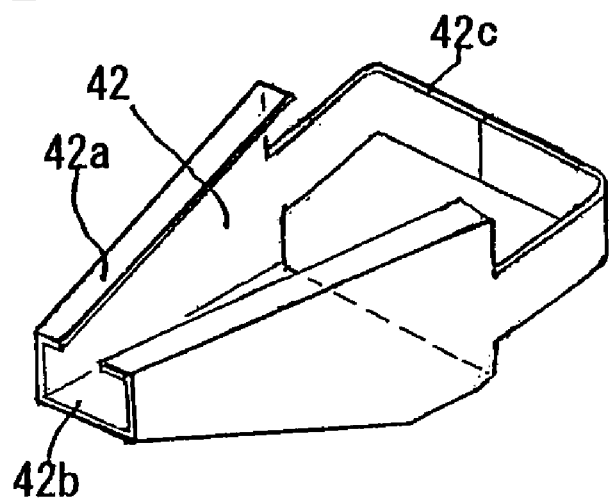

FIG. 10A is a sectional view showing how a magnet assembly 40 is mounted on each claw-shaped magnetic pole 14a, 15a according to a fifth embodiment of the invention, and FIG. 10B is a perspective view of a magnet mounting member 42 of the magnet assembly 40, in which elements identical or similar to those of the first embodiment are designated by the same reference numerals.

In this embodiment, the magnet mounting member 42 for holding the magnets 21 against the side surfaces of the claw-shaped magnetic pole 14a, 15a has a pair of left and right retaining straps 42c extending from a forward portion of the magnet mounting member 42 mounted on the magnetic pole 14a, 15a and bent to hold on the rear side of the claw-shaped magnetic pole 14a, 15a. Provided on left and right sides of the magnet mounting member 42, the retaining straps 42c securely embrace the claw-shaped magnetic pole 14a, 15a around its rear side.

The magnet assemblies 40 are built up and mounted on the claw-shaped magnetic poles 14a, 15a as follows. First, each magnet assembly 40 is assembled by fitting the magnets 21 in magnet retaining portions 42a of the magnet mounting member 42 and fitted in the recess 14c, 15c in the claw-shaped magnetic pole 14a, 15a and the left and right retaining straps 42c are fitted over a rear portion of the claw-shaped magnetic pole 14a, 15a. Then, butt ends of the left and right retaining straps 42c facing each other are joined by welding, for example, whereby the magnet assembly 40 is completed.

Each magnet assembly 40 is hooked up on the rear side of the claw-shaped magnetic pole 14a, 15a as stated above. This construction serves to securely hold the magnet assemblies 40 at fixed positions and prevent the magnet assemblies 40 from being displaced along the claw-shaped magnetic pole 14a, 15a toward its extreme end due to a centrifugal force acting on each magnet assembly 40 as a result of rotation of the rotor 10.

It will be apparent that the aforementioned construction of the magnet mounting member 42 having the retaining straps 42c of this embodiment is applicable also to the constructions of the first to fourth embodiments.

What is claimed is:
1. A rotor of a rotating electric machine, said rotor comprising:
   a rotary shaft;
   a rotor coil surrounding the rotary shaft;
   a pair of pole core members having a plurality of claw-shaped magnetic poles extending like claws along an axial direction of the rotor at regular intervals around the rotor, each of the claw-shaped magnetic poles becoming thinner toward its extreme end forming an inclined inside surface facing the rotary shaft, and the pole core members being fitted on the rotary shaft with their claw-shaped magnetic poles directed face to face from front and rear sides and engaged with one another so that the claw-shaped magnetic poles surround the rotor coil;
   a plurality of magnets located on both sides of each of the claw-shaped magnetic poles such that each of the magnets produces a magnetic field oriented in a direction opposite to the direction of a magnetic flux formed between the adjacent claw-shaped magnetic poles; and
   a plurality of magnet mounting members for holding the magnets against both side surfaces of each of the claw-shaped magnetic poles;
   wherein each of the magnet mounting members has a generally C-shaped cross section including a plurality of magnet retaining portions formed on both sides for holding the magnets against the side surfaces of each of the claw-shaped magnetic poles and a middle portion having a platelike shape which matches the inclined inside surface of each of the claw-shaped magnetic poles, each of the magnet mounting members and the magnets fitted in the magnet retaining portions on both sides together forming a magnet assembly;
   wherein each of the claw-shaped magnetic poles of the pole core members has a stopper portion protruding toward the rotary shaft from the extreme end of each of the claw-shaped magnetic poles on the inclined inside surface; and wherein the magnet assembly is fixedly mounted on each of the claw-shaped magnetic poles with the middle portion of the magnet mounting member engaged with the stopper portion formed on the inclined inside surface of each of the claw-shaped magnetic poles.

2. The rotor of the rotating electric machine according to claim 1, wherein the magnet assembly is mounted on each of the claw-shaped magnetic poles with a bonding agent applied to the middle portion of the magnet mounting member, and the magnet mounting member is affixed to each of the claw-shaped magnetic poles as the bonding agent hardens.

3. The rotor of the rotating electric machine according to claim 1, wherein the magnet mounting member is affixed to each of the claw-shaped magnetic poles by welding the magnet mounting member to the stopper portion of each of the claw-shaped magnetic poles.

4. The rotor of the rotating electric machine according to claim 1, wherein the magnet mounting member is affixed to each of the claw-shaped magnetic poles by caulking the stopper portion of each of the claw-shaped magnetic poles.

5. The rotor of the rotating electric machine according to claim 1, wherein the magnet mounting member is affixed to each of the claw-shaped magnetic poles by mounting the magnet mounting member with the middle portion thereof bent in a curved shape.

6. The rotor of the rotating electric machine according to claim 1, said rotor further comprising a backup ring fitted inside the claw-shaped magnetic poles, the backup ring having a truncated cone-shaped outer surface of which diameter is such that the outer surface of the backup ring is in tight contact with an inclined inside surface of the magnet assembly mounted on each of the claw-shaped magnetic poles.

7. The rotor of the rotating electric machine according to claim 1, wherein the magnet mounting member of the magnet assembly has a retainer which extends from both sides of a basal part of the magnet mounting member and embraces each of the claw-shaped magnetic poles around its rear side when mounted over each of the claw-shaped magnetic poles.

* * * * *